(12) United States Patent
Park

(10) Patent No.: US 8,056,193 B2
(45) Date of Patent: Nov. 15, 2011

(54) PLASTIC FASTENER

(75) Inventor: Yoon-Hwa Park, Buk-gu (KR)

(73) Assignee: TRW Controls & Fasteners Inc, Incheon (KR)

( * ) Notice: Subject to any disclaimer, the term of this patent is extended or adjusted under 35 U.S.C. 154(b) by 284 days.

(21) Appl. No.: 11/917,051

(22) PCT Filed: Jun. 8, 2006

(86) PCT No.: PCT/KR2006/002183
§ 371 (c)(1),
(2), (4) Date: Dec. 10, 2007

(87) PCT Pub. No.: WO2006/132497
PCT Pub. Date: Dec. 14, 2006

(65) Prior Publication Data
US 2008/0196222 A1 Aug. 21, 2008

(30) Foreign Application Priority Data
Jun. 8, 2005 (KR) .................. 10-2005-0048984

(51) Int. Cl.
F16B 5/12 (2006.01)
(52) U.S. Cl. .................. 24/297; 24/453; 24/458
(58) Field of Classification Search ............ 24/297, 24/453, 458
See application file for complete search history.

(56) References Cited

U.S. PATENT DOCUMENTS

| 3,197,935 A * | 8/1965 | Clancy et al. ........... 52/718.04 |
| 5,797,714 A | 8/1998 | Oddenino |
| 5,966,782 A * | 10/1999 | Ishihara et al. .......... 24/297 |
| 6,119,316 A * | 9/2000 | Ishihara et al. .......... 24/297 |
| 6,317,937 B1 * | 11/2001 | Ishihara et al. .......... 24/297 |
| 6,449,814 B1 | 9/2002 | Dinsmore et al. |
| 6,648,542 B2 | 11/2003 | Smith et al. |
| 6,796,006 B2 * | 9/2004 | Hansen ................... 24/297 |
| 7,461,436 B2 * | 12/2008 | Asano .................... 24/297 |
| 7,552,516 B2 * | 6/2009 | Okada et al. ............. 24/297 |
| 2002/0004971 A1 | 1/2002 | Ichimaru et al. |

FOREIGN PATENT DOCUMENTS

| CN | 1601119 A | 3/2005 |
| JP | 03069312 | 11/1989 |
| JP | 0735115 | 2/1995 |
| JP | 8 200333 | 8/1996 |
| KR | 10 1998 029416 | 7/1998 |
| KR | 20 0226412 | 6/2001 |

* cited by examiner

Primary Examiner — Robert Sandy
Assistant Examiner — Michael Lee
(74) Attorney, Agent, or Firm — Tarolli, Sundheim, Covell & Tummino LLP

(57) ABSTRACT

A fastener includes a fastener body having a pair of legs. A shoulder portion causes the legs to be elastically engaged with inner edges of a mounting aperture when the fastener is inserted into the mounting aperture. A gripper portion includes a pair of gripper arms that interpose an insertion rib between a pair of opposite gripper surfaces of the pair of gripper arms when the fastener is fitted to the insertion rib. An engagement projection is formed on any one of the pair of gripper surfaces and extends from one of the pair of gripper surfaces to a height exceeding half of the distance between the pair of gripper surfaces so as to engage with an engagement slot formed on the insertion rib.

16 Claims, 8 Drawing Sheets

PRIOR ART

PRIOR ART

PLASTIC FASTENER

TECHNICAL FIELD

The present invention relates to a plastic fastener, and more particularly to a fastener for removably mounting an instrument cluster, a center cluster or other members (which will be referred to as a "cluster" hereinafter) to the instrument panel of a vehicle.

BACKGROUND ART

Conventionally, a fastener for removably mounting a cluster to the instrument panel of a vehicle has been generally formed of metal or plastic. In FIGS. 7 and 8, an assembled state of such a fastener is shown in a cross-sectional view.

The fastener shown in FIG. 7 is one made using a metal spring plate. FIG. 7 shows a conventional use of a metal fastener. As shown in FIG. 7, the fastener 300 is mounted with an insertion rib 322 of a cluster 320 interposed and closely contacted between grippers 310. Further, one of the grippers 310 is provided at one end thereof with an engagement pin 312, which is inserted into a engagement hole 324 of the insertion rib 322. In this manner, when the fastener 300, pre-mounted to the insertion rib 322, is inserted from an outer surface 336 of the instrument panel 330 into a mounting aperture 332 of the instrument panel 330, both opposite shoulder portions 314 of the fastener 300 are engaged with inner edges of the mounting aperture 332 in the inner surface 334 of the instrument panel 330, and simultaneously, an attached surface of the insertion rib 322 is pressed against the outer surface 336 of the instrument panel 330. Thereby, the cluster 320 is fixed to the instrument panel 330.

However, the above conventional fastener 300 has such problems that it is not firmly fixed because its grippers 310 are brought into point contact with the insertion rib 322, and is readily bent or loosened because it is made of metal. Further, while the cluster 320 is manipulated before the mounted fastener 300 is fixed into the mounting aperture 332, the fastener 300 would be separated from the cluster 320. In addition, after the cluster 320 is fixed to the instrument panel 330, a noise would be generated by vibration of the metal fastener.

In order to overcome these problems, the plastic fastener shown in FIG. 8 has been proposed. The fastener 400 of FIG. 8 comprises a fastener body 410 having a U shape, a pair of legs 412 extending in parallel, and a pair of gripper arms 414 extending from the inside of the fastener body 410. Each of the gripper arms 414 has a free end formed with an engagement projection 416. Further, the free ends of the legs 412 are formed with stabilizers 419 protruding outwardly therefrom, respectively.

The pair of gripper arms 414 have flat gripper surfaces 413 formed as opposite inner surfaces. The free ends of the gripper arms 414 are formed with the engagement projections 416 fixed in an engagement slot 424 of an insertion rib 422. The fastener body 410 connected with the pair of legs 412 is formed on both opposite sides thereof with shoulder portions 418 protruding outwardly.

When the fastener 400 is fixed to the insertion rib 422 of a cluster 420, the insertion rib 422 is brought into surface contact between the gripper surfaces 413 of the gripper arms 414, and simultaneously the engagement projections 416 are fixed in the engagement slot 424 of the insertion rib. When the fastener 400 is inserted from an outer surface 436 of the instrument panel 430 into a mounting aperture 432 of an instrument panel 430 after being fixed to the insertion rib 422, the shoulder portions 418 of the fastener 400 are elastically pressed against an inner surface 434 of the instrument panel 430 around the mounting aperture 432 of the instrument panel 430.

In the plastic fastener 400, the insertion rib 422 is thin, and the free ends of the pair of gripper arms 414 are formed with engagement projections 416 fixed in the engagement slot 424 of the insertion rib 422. As such, the engagement projections 416 have difficulty not only in securing the depth at which they enter the engagement slot 424, but also maintaining sufficient engagement force between the engagement projections 416 and the engagement slot 424. Especially, when the cluster 420 is removed from the instrument panel 430 for maintenance or repair, the fastener 400 should be separated from the instrument panel 430 together with the insertion rib 422. However, when the engagement depth between the engagement projections 416 and the engagement slot 424 is not sufficiently provided, the fastener 400 is left on the side of the instrument panel 430, or falls down to the bottom, which leads to confusion during maintenance work.

Further, when the thickness of the insertion rib 422 increases to sufficiently secure the engagement depth, an outer surface of the cluster 420, which is viewed inside the vehicle by any occupant such as a driver, is subjected to a sink by the thickness difference between the insertion rib 422 and a base of the cluster 420 integrally formed with the insertion rib 422. Therefore, such a sink spoils the indoor scenery of the vehicle.

DISCLOSURE OF THE INVENTION

Therefore, the present invention has been made in view of the above-mentioned problems, and it is an objective of the present invention to provide a plastic fastener free from bending or loosening It is another objective of the present invention to provide a plastic fastener, in which an engagement projection secures a sufficient engagement depth in a engagement slot without increasing the thickness of an insertion rib, thereby separating a cluster from an instrument panel together with the fastener.

According to an aspect of the present invention, there is provided a fastener for removably mounting a mounting object having an insertion rib into a mounting aperture formed on a panel, the fastener comprising:

a fastener body comprising a pair of legs extending in parallel, each leg having one fixed end and one free end, and a shoulder portion causing the legs to be elastically engaged with the inner edges of the mounting aperture when the fastener is inserted into the mounting aperture of the panel;

a gripper portion having a pair of gripper arms extending from the inner side of the fastener body, and interposing the insertion rib between a pair of opposite gripper surfaces of the pair of gripper arms when the fastener is fitted to the insertion rib; and an engagement projection formed on any one of the pair of gripper surfaces, and engaged into a engagement slot at a height exceeding half of the depth of the engagement slot when the insertion rib is interposed between the pair of gripper arms.

In this manner, the engagement projection is formed on any one of the pair of gripper surfaces, and has the height exceeding the half of the depth of the engagement slot, so that it is possible to sufficiently secure the engagement depth without increasing the thickness of the insertion rib.

In one embodiment of the present invention, the height of the engagement projection may be formed to be more than 80% of the depth of the engagement slot.

Preferably, the pair of gripper arms may be formed with tapered guide surfaces on ends thereof opposite to the fastener body so as for the insertion rib to be guided between the pair of gripper arms, so that the fastener can be easily coupled with the insertion rib.

The engagement projection may include a first inclined projection surface guiding the insertion rib to be inserted, and a second projection surface engaged to the engagement slot when the insertion rib is interposed between the pair of gripper arms. Especially, the second projection surface may be formed so as to have a downward slant toward one of the gripper arms, so that it can be more firmly engaged into the engagement projection formed on the insertion rib.

Meanwhile, the gripper surface of the other gripper arm opposite to the engagement projection may be formed with a recess, and a bulge is formed continuously in a direction extending from the recess, and thereby may have an S shape on the whole. In the other gripper arm having the S shape, the bulge elastically presses one side of the insertion rib, so that it can strengthen the engagement between the engagement slot of the insertion rib and the engagement projection.

The fastener may further comprise stabilizers protruding outwardly from the free ends of the legs. Furthermore, when the fastener is inserted into the mounting aperture, the stabilizers may be elastically supported on an outer surface of the instrument panel.

According to the fastener of the present invention, the engagement projection is formed on any one of the pair of gripper surfaces, and has a height exceeding half of the depth of the engagement slot, so that the engagement projection can be engaged into the engagement slot, which is formed on the insertion rib having substantially the same thickness as the distance between the pair of gripper surfaces, at a sufficient engagement depth. As a result, when the cluster is removed from the instrument panel for maintenance or repair, the fastener is left coupled with the insertion rib of the cluster, so that the problem that the fastener is left in the mounting aperture of the instrument panel, or is lost by falling down to the bottom can be solved.

Further, in order to firmly engage the engagement projection into the engagement slot formed on the insertion rib, it is not necessary to increase the thickness of the insertion rib. As a result, it is possible to prevent a sink from being generated on the outer surface of the cluster integrally formed of a plastic resin due to the increase in thickness of the insertion rib, thereby spoiling external appearance.

In addition, the fastener can be stably fixed in the mounting aperture of the instrument panel by the stabilizers protruding outwardly from the ends of the pair of legs thereof.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the exemplary embodiments of the present invention.

Figure 1:
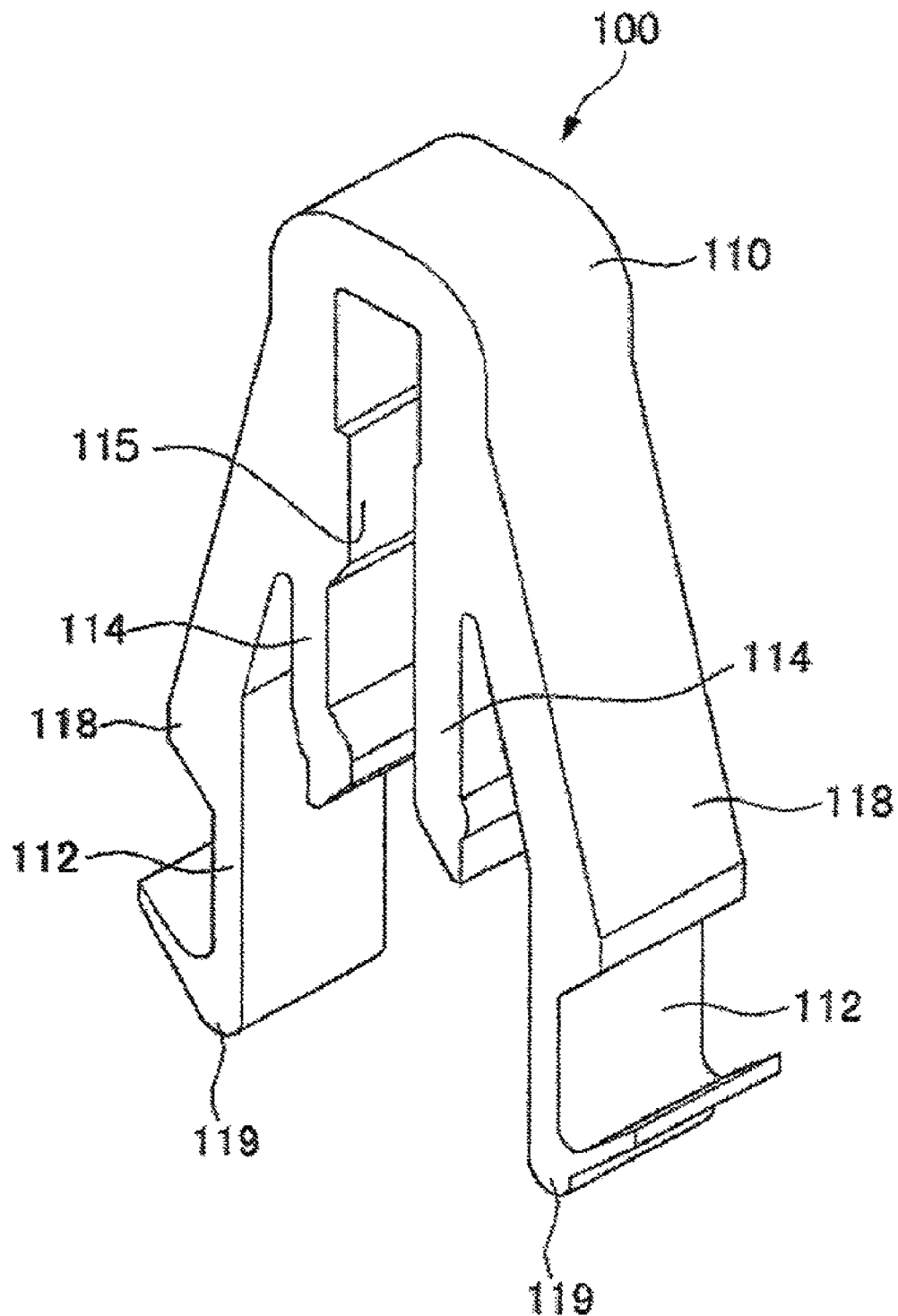
FIG. 1 is a perspective view of a fastener according to a first embodiment of the present invention.
Figure 2:
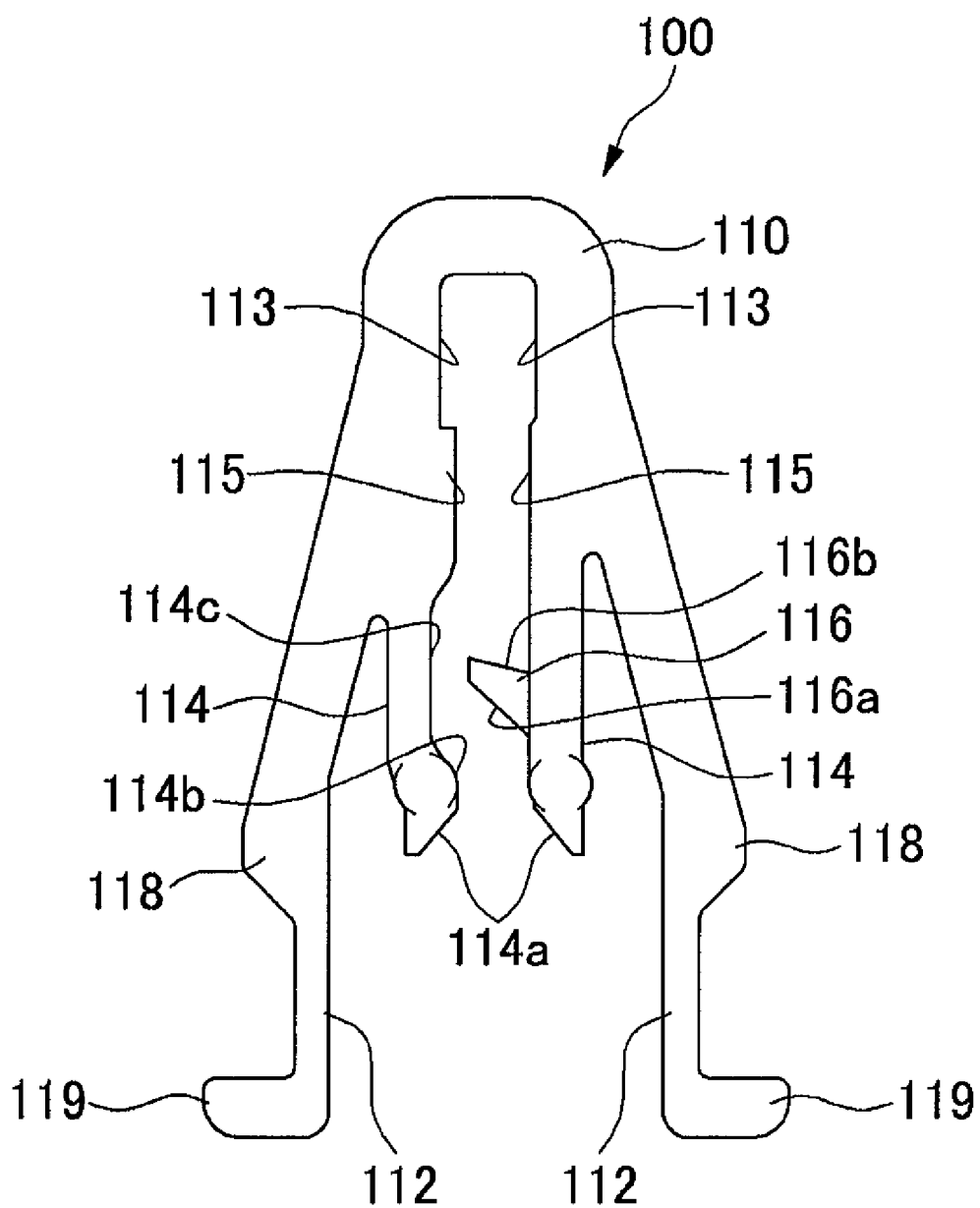
FIG. 2 is a side view of the fastener of FIG. 1.
Figure 3:
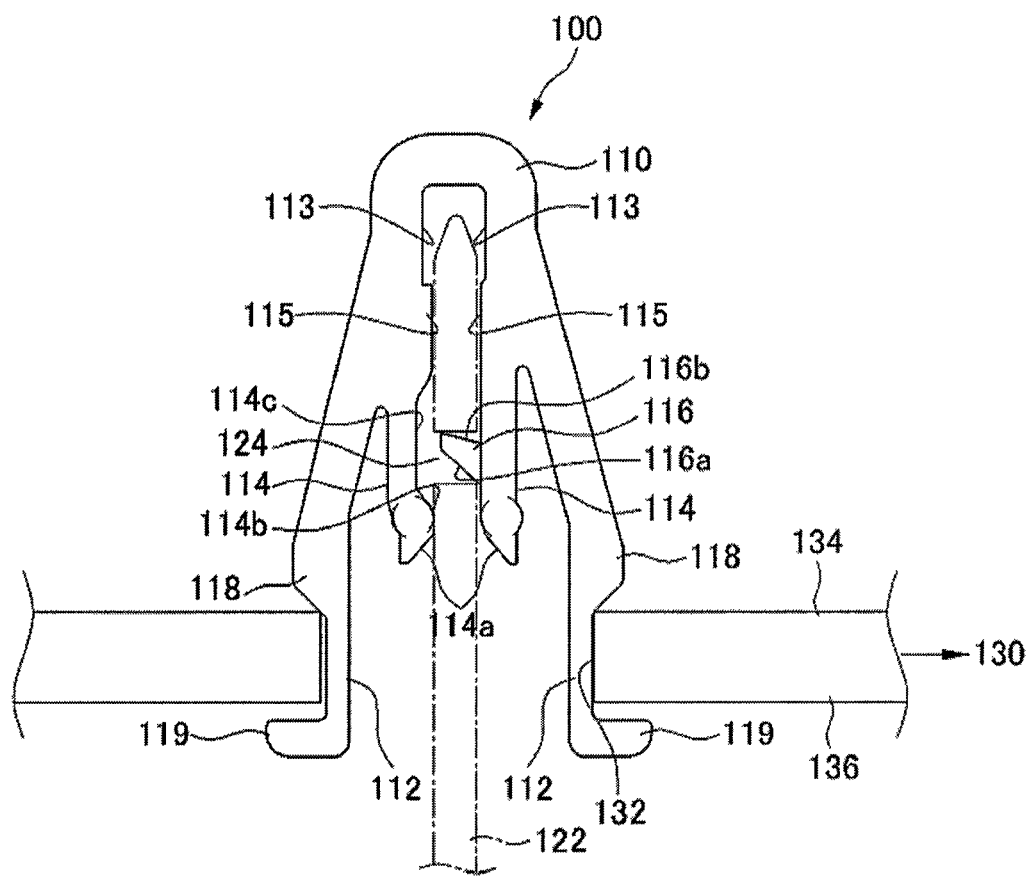
FIG. 3 illustrates an assembled state of the fastener of FIG. 1.

FIG. 1 illustrates a fastener according to a first embodiment of the present invention in a perspective view, FIG. 2 illustrates the fastener of FIG. 1 in a side view, and FIG. 3 illustrates an assembled state in which a cluster is fixed to an instrument panel using the fastener of FIG. 1.

The fastener 100 illustrated in FIGS. 1 to 3 is formed by a method, such as injection molding, using a plastic resin, and is generally comprised of a fastener body 110, a gripper portion having a pair of gripper arms 114 extending from the inside of the fastener body 110, and a engagement projection 116 protruding from one of the pair of gripper arms 114. The fastener body 110 includes inner surfaces 113, a pair of legs 112, and shoulder portions 118. The inner surfaces 113 of the fastener body 110 have an inverted U shape together, and the pair of legs 112 extend continuously from portions having the inner surfaces 113. Hence, each of the legs 112 has one end formed as a fixed end, and the other end formed as a free end. The legs 112 have the shoulder portions 118 protruding outwardly from approximately middle portions thereof, respectively. Further, the free ends of the legs 112 are formed with stabilizers 119 protruding outwardly therefrom, respectively.

The pair of gripper arms 114 of the gripper portion extend from the portions having the inner surfaces 113, respectively. The pair of gripper arms 114 have a pair of gripper surfaces 115 disposed to be approximately parallel to each other, respectively. The engagement projection 116, which protrudes inwards toward the gripper surface 115, is formed on a first one of the gripper arms 114, preferably at a middle position of the first gripper arm 114. The engagement projection 116 has a first projection surface 116a and a second projection surface 116b. The first projection surface 116a extends toward the free end of the first gripper arm 114 so as to have a downward slant, while the second projection surface 116b also extends toward the gripper surface 115 of the grip first arm 114 at a certain downwardly slanted angle. The slanted angle of the second projection surface 116b is within a range from about 7 to 8°.

The second gripper arm 114 without the engagement projection 116 is formed with a recess 114c that is opposite to the engagement projection 116, and a bulge 114b that protruding inwardly relative to the recess 114c, thereby having a S shape on the whole. Further, the free ends of the pair of gripper arms 114 are each provided with an tapered guide surface 114a so as to have a V shape.

An example in which the cluster is fixed to the instrument panel using the fastener 100 constructed as mentioned above is illustrated in FIG. 3. A function of the fastener 100 will be described through the process of mounting the cluster 120 to the instrument panel 130.

Figure 4:
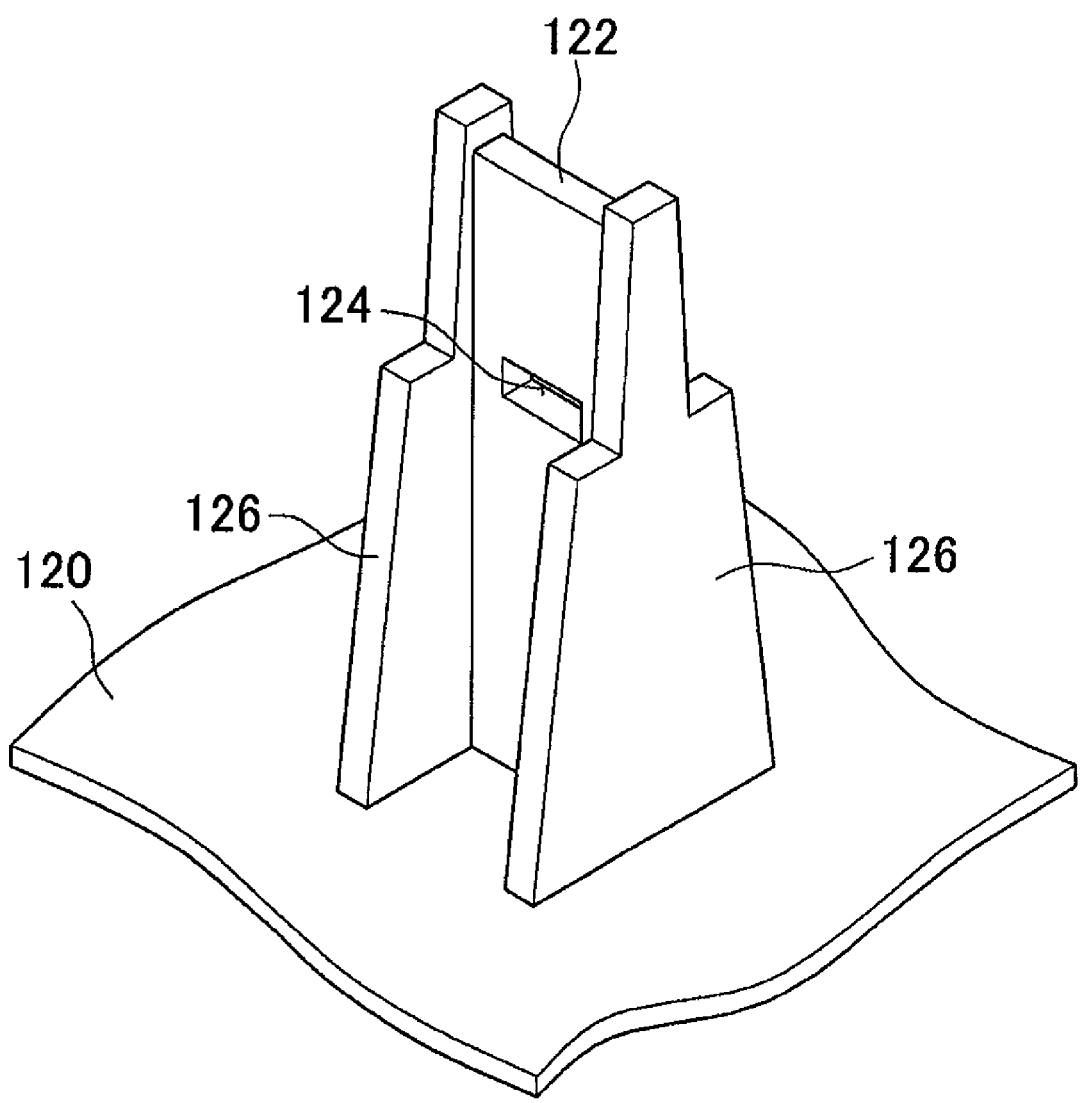
FIG. 4 is a partial perspective view of a cluster showing the appearance of an insertion rib.

First, the fastener 100 is pressed toward the insertion rib 122 of the cluster 120 having a shape shown in FIG. 4. The insertion rib 122 is integrally molded as a part of the cluster 120. On both longitudinal ends of the insertion rib 122, reinforced walls 126 extend perpendicular to the insertion rib 122. The insertion rib 122 is formed on an upper portion thereof with the engagement slot 124, which has a rectangular shape and is adapted to wholly pass through the insertion rib 122.

When the insertion rib 122 enters between the pair of gripper arms 114, the V-shaped guide surfaces 114a, which are formed at the free ends of the gripper arms 114, serve to guide the insertion rib 122 to easily enter between the pair of gripper arms 114. Subsequently, the insertion rib 122 slides over the slanted first projection surface 116a of the claming nose 116, and then passes between the pair of gripper surfaces 115 opposite to each other.

When an upper end of the insertion rib 122 approaches a closed end of the fastener body 110, the engagement projection 116, which is formed on one side of the first gripper arm 114, is pushed and engaged into the engagement slot 124. At this time, the second projection surface 116b of the engagement projection 116, which is brought into direct contact with the engagement slot 124 of the insertion rib 122, is formed at a downward slant angle of about 7 to 8° with respect to the gripper surface 115, as described above. As such, the second projection surface 116b makes it more difficult for the insertion rib 122 to move to a direction in which the insertion rib 122 is released from the fastener 100, so that the coupling between the cluster 120 and the fastener 100 is strengthened.

As soon as the engagement projection 116 is engaged into the engagement slot 120, both surfaces of the insertion rib 122 are brought into surface contact with the pair of opposite gripper surfaces 115, respectively.

The thickness of the insertion rib 122 is substantially equal to or slightly greater than a distance between the pair of opposite gripper surfaces 115 of the pair of gripper arms 114. Hence, the insertion rib 122 interposed between the pair of gripper surfaces 115 is pressed by the pair of opposite gripper surfaces 115.

Here, the engagement projection 116 is adapted to have a protrusion height exceeding at least half of the distance between the pair of gripper surfaces 115 the insertion rib 122, and preferably exceeding about 80% of the distance between the pair of gripper surfaces 115.

With this construction, it is possible to secure a sufficient engagement depth between the engagement projection 116 and the engagement slot without increasing the thickness of the insertion rib 122, compared to an example in which both of the gripper arms are formed with such engagement projections 116.

When the protrusion height of the engagement projection 116 exceeds at least half of the distance between the pair of gripper surfaces 115, a passage through which the insertion rib 122 passes becomes too narrow, which may interfere with the insertion of the insertion rib 122. Hence, the recess 114c is formed on the other gripper arm 114 opposite to the engagement projection 116, thereby securing a necessary width of the insertion passage. Furthermore, the bulge 114b is formed around the free end transited from the recess 114c, so that the other gripper arm 114 has an approximately C shape. The bulge 114b elastically presses one surface of the insertion rib 122, thereby strengthening the engagement between the engagement projection 116 and the engagement slot 124.

After the fastener 100 is fixed to the insertion rib 122 of the cluster 120, the cluster 120 is mounted from the outside of the instrument panel 130. The instrument panel 130 is formed with the mounting aperture 132. Until the shoulder portions 118 protruding outwardly at approximately middle positions of the pair of legs 112 pass through the mounting aperture 132, and then are elastically supported on the inner surface 134 of the instrument panel 130 which is bordered by the mounting aperture 132, the insertion rib 122 of the cluster 120 is inserted toward the blind end of the fastener body 110. As a result, the cluster 120 is removably maintained at the instrument panel 130.

As shown in FIG. 3, the stabilizers 119 protruding outwardly from the free ends of the pair of legs 112 are not engaged with the instrument panel 130. Accordingly, the stabilizers 119 can be eliminated from the legs 112. Alternatively, the stabilizers 119 may be geometrically deformed so as not only to allow the cluster 120 to be stably mounted to the instrument panel 130 but also come into surface contact with the outer surface 136 of the instrument panel 130.

Figure 5:
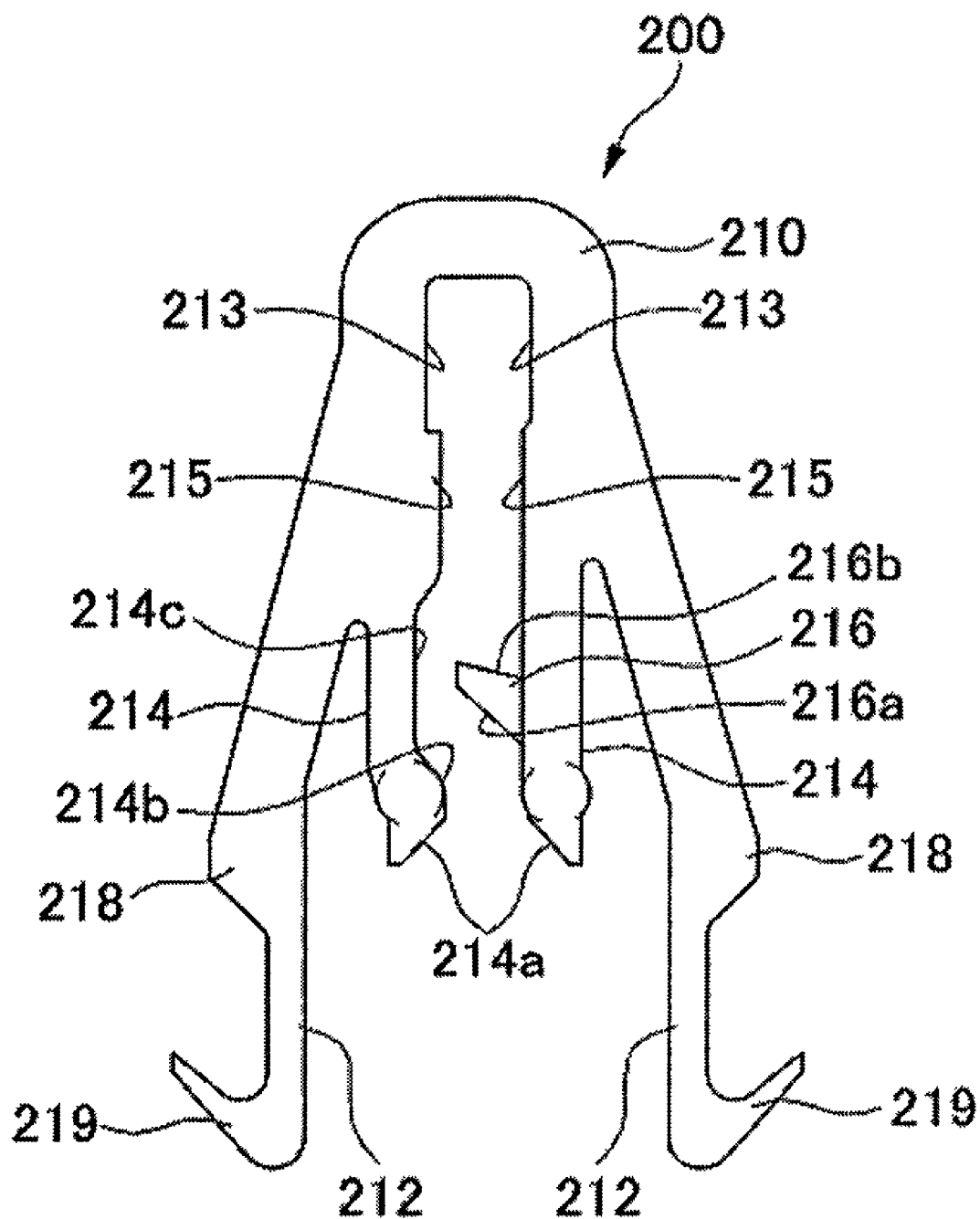
FIG. 5 is a side view of a fastener according to a second embodiment of the present invention.
Figure 6:
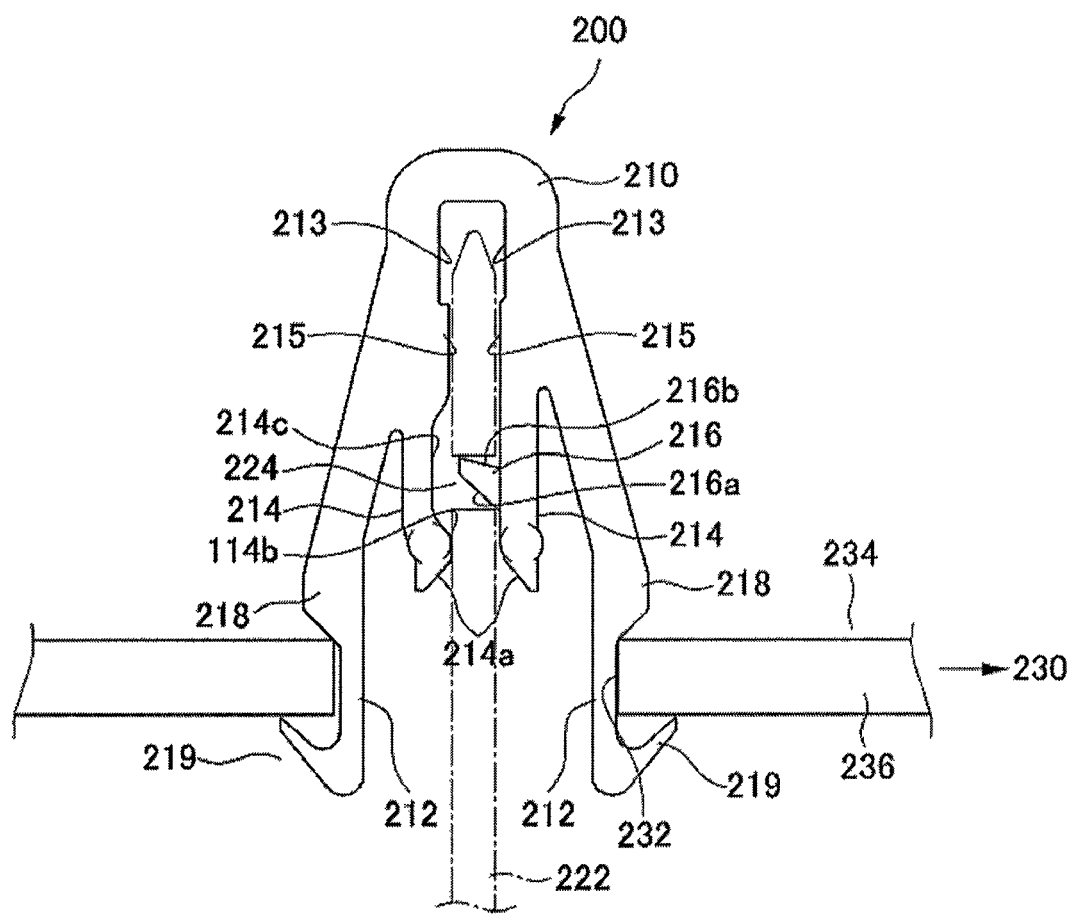
FIG. 6 illustrates an assembled state of the fastener of FIG. 4.
Figure 7:
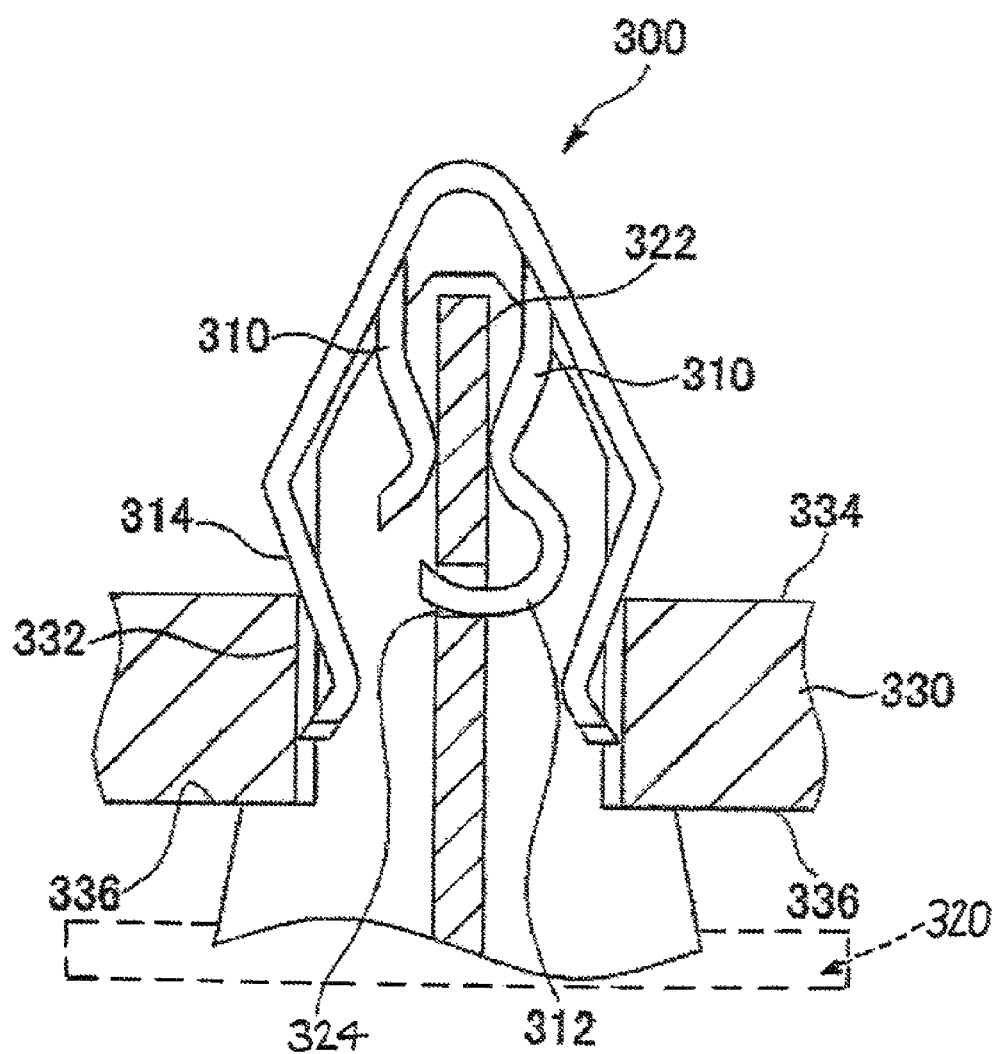
FIG. 7 illustrates an assembled state of a conventional metal fastener.
Figure 8:
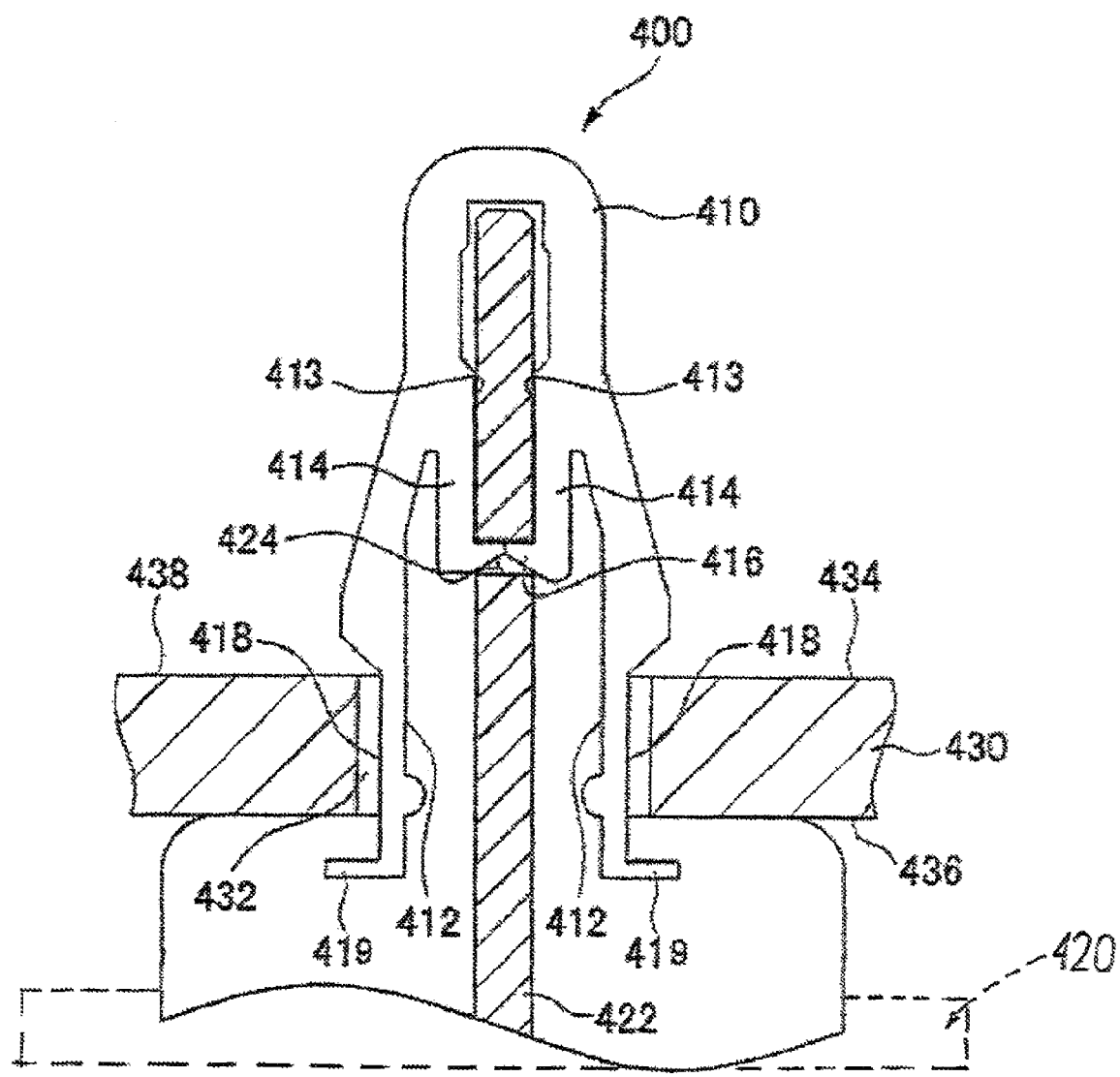
FIG. 8 illustrates an assembled state of a conventional plastic fastener.

In FIGS. 5 and 6, a fastener 200, according to a second embodiment of the present invention, is illustrated in a side view and in an assembled state. The fastener 200 according to a second embodiment is similar to the fastener 100, according to a first embodiment, shown in FIGS. 1 to 3, except for the shapes of stabilizers 219 protruding outwardly from free ends of a pair of legs 212. Features in FIGS. 5 and 6 that are substantially similar to features in FIGS. 1 to 3 are given a reference number that is 100 higher than the reference number given to the corresponding feature in FIGS. 1 to 3, e.g., the gripper arms 114 and engagement projections 116 of FIGS. 1 to 3 correspond with the gripper arms 214 and engagement projections 216, respectively, of FIGS. 5 and 6.

Therefore, the stabilizers 219 distinguished from those of the fastener 100 according to a first embodiment will be described. The stabilizers 219 protrude outwardly from the pair of legs 212 so as to be inclined upwardly. Hence, when the fastener 200 is inserted into the mounting aperture 232 of an instrument panel 230, the stabilizers 219 are elastically supported on an outer surface 236 of the instrument panel 230. As a result, the insertion rib 222 of a cluster 220 is fixed inside the mounting aperture 232 of the instrument panel 230 by the fastener 200.

As described above, the fasteners 100 and 200 are used to mount the clusters 120 and 220 on the instrument panels 130 and 230, respectively. However, these types of fasteners 100 and 200 may be used to mount various components such as accessories, moldings, or parts for the vehicular chassis.

INDUSTRIAL APPLICABILITY

As can be seen from the foregoing, according to the present invention, the fastener removably mounts the cluster to the instrument panel of the vehicle. Thus, the fastener of the present invention can be usefully applied to vehicle related industries.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A fastener for removably mounting a mounting object having an insertion rib into a mounting aperture formed on a panel, the fastener comprising
   a fastener body comprising a pair of legs extending in parallel, each leg having one fixed end and one free end, and a shoulder portion causing the legs to be elastically engaged with inner edges of the mounting aperture when the fastener is inserted into the mounting aperture of the panel;
   a gripper portion including a pair of gripper arms extending from an inner side of the fastener body, and interposing the insertion rib between a pair of opposite gripper surfaces of the pair of gripper arms when the fastener is fitted to the insertion rib; and an engagement projection formed on any one of the pair of gripper surfaces and extending from one of the pair of gripper surfaces toward the other one of the pair of gripper surfaces to a height exceeding half of the distance between the pair of gripper surfaces so as to engage with an engagement slot formed on the insertion rib, the other gripper arm opposite to the engagement projection including a recess and a bulge formed continuously in a direction extending from the recess, the recess and the bulge formed from the other one of the pair of gripper surfaces, and thereby the entire other gripper arm having an S shape, the recess being aligned with the engagement projection.

2. The fastener of claim 1, wherein each end of the pair of gripper arms opposite to the fastener body includes a tapered guide for guiding the insertion rib to be positioned between the pair of gripper arms.

3. The fastener of claim 1, wherein the engagement projection comprises a first inclined projection surface guiding the insertion rib to be inserted, and a second projection surface engaged to the engagement slot when the insertion rib is interposed between the pair of gripper arms.

4. The fastener of claim 3, wherein the second projection surface has a downward slant toward one of the gripper arms.

5. The fastener of claim 1, wherein the height of the engagement projection is more than 80% of a depth of the engagement slot.

6. The fastener of claim 1, further comprising a stabilizer formed on the free end of each leg and protruding outwardly so as to be elastically supported on an outer surface of the panel when the fastener is inserted into the mounting aperture.

7. The fastener according to claim 1, wherein the engagement projection is spaced from a free end of the gripper arm on which the engagement projection is formed.

8. The fastener assembly according to claim 1, wherein each of the gripper arms has one end fixed with the fastener body and one free end.

9. A fastener assembly comprising
a fastener for removably mounting a mounting object,
a panel including a mounting aperture into which the fastener is inserted; and
a mounting object including an insertion rib interposed between a pair of opposite gripper surfaces of the fastener,
wherein the fastener removably mounts the mounting object into the mounting aperture formed on the panel, and wherein the fastener comprises:
a fastener body comprising a pair of legs extending in parallel, each leg having one fixed end and one free end, and a shoulder portion causing the legs to be elastically engaged with inner edges of the mounting aperture when the fastener is inserted into the mounting aperture of the panel;
a gripper portion including a pair of gripper arms extending from an inner side of the fastener body, and interposing the insertion rib between a pair of opposite gripper surfaces of the pair of gripper arms when the fastener is fitted to the insertion rib; and
an engagement projection formed on any one of the pair of gripper surfaces and extending from one of the pair of gripper surfaces toward the other one of the pair of gripper surfaces to a height exceeding half of the distance between the pair of gripper surfaces so as to engage with an engagement slot formed on the insertion rib, the other gripper arm opposite to the engagement projection including a recess and a bulge formed continuously in a direction extending from the recess, the recess and the bulge formed from the other one of the pair of gripper surfaces, and thereby the entire other gripper arm having an S shape, the recess being aligned with the engagement projection.

10. The fastener assembly according to claim 9, wherein each end of the pair of gripper arms opposite to the fastener body includes a tapered guide for guiding the insertion rib to be positioned between the pair of gripper arms.

11. The fastener assembly according to claim 9, wherein the engagement projection comprises a first inclined projection surface guiding the insertion rib to be inserted, and a second projection surface engaged to the engagement slot when the insertion rib is interposed between the pair of gripper arms.

12. The fastener assembly according to claim 11, wherein the second projection surface has a downward slant toward one of the gripper arms.

13. The fastener assembly according to claim 9, wherein the height of the engagement projection is more than 80% of a depth of the engagement slot.

14. The fastener assembly according to claim 9, further comprising a stabilizer formed on the free end of each leg and protruding outwardly so as to be elastically supported on an outer surface of the panel when the fastener is inserted into the mounting aperture.

15. The fastener according to claim 9, wherein the engagement projection is spaced from a free end of the gripper arm on which the engagement projection is formed.

16. The fastener assembly according to claim 9, wherein each of the gripper arms has one end fixed with the fastener body and one free end.

* * * * *